United States Patent
Sharma

(10) Patent No.: US 6,353,675 B1
(45) Date of Patent: Mar. 5, 2002

(54) METHODS AND APPARATUS FOR IDENTIFYING MARKING PROCESS AND MODIFYING IMAGE DATA BASED ON IMAGE SPATIAL CHARACTERISTICS

(75) Inventor: Gaurav Sharma, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/233,108

(22) Filed: Jan. 19, 1999

(51) Int. Cl.[7] .................................................. G06K 9/00
(52) U.S. Cl. ...................................... 382/141; 358/502
(58) Field of Search ................................ 382/140, 141, 382/142, 143, 239.2, 201; 358/502, 505, 512, 515, 516, 517, 518, 523, 527, 534, 459, 302

(56) References Cited

U.S. PATENT DOCUMENTS

| | | | |
|---|---|---|---|
| 4,196,451 A | * 4/1980 | Pellar | 358/459 |
| 5,119,132 A | * 6/1992 | Butler | 355/208 |
| 5,166,809 A | 11/1992 | Surbrook | |
| 5,357,581 A | * 10/1994 | Hadgis | 382/173 |
| 5,803,579 A | * 9/1998 | Turnbull et al. | 362/83.1 |

* cited by examiner

Primary Examiner—Andrew W. Johns
Assistant Examiner—Seyed Azarian
(74) Attorney, Agent, or Firm—Oliff & Berridge, PLC

(57) ABSTRACT

A marking process used to mark an image on a substrate, such as a photographic marking process, a lithographic marking process, an ink-jet marking process, a line-on-line xerographic marking process or a rotated-screen xerographic marking process, is automatically detected using at least one image spatial characteristic obtained from image information picked up from the image. The at least one spatial characteristic, which is unique to the type of marking process, is obtained, for example, by generating an image power spectrum and analyzing the power spectrum according to the existence, position, and/or color of spectral peaks, and/or the existence or absence of abnormally high energy at the high frequencies in the power spectrum.

21 Claims, 8 Drawing Sheets

METHODS AND APPARATUS FOR IDENTIFYING MARKING PROCESS AND MODIFYING IMAGE DATA BASED ON IMAGE SPATIAL CHARACTERISTICS

BACKGROUND OF THE INVENTION

1. Field of Invention

This invention relates to methods and apparatus that automatically identify the marking process used to form an image on a substrate. More particularly, this invention relates to methods and apparatus for identifying the marking process based on spatial characteristics of the image.

2. Description of Related Art

In order to accurately calibrate a color scanner that scans an image carried on a substrate, a different calibration transformation is required depending on the marking process and materials used to form the image on the substrate. For example, the calibration transformation that is used to calibrate the scanner for a photographic image is different from the calibration transformation that is used to calibrate the scanner for an ink-jet-printed image, which is in turn different from the calibration transformation that is used to calibrate the scanner for a xerographically-formed image.

Typically, a user wishing to scan an image must determine the marking process used to form the image, and then manually identify the marking process (e.g., photographic, lithographic, ink-jet, line-on-line xerographic or rotated-screen xerographic) to the scanner so that an appropriate calibration can be made.

An approach to automatically identifying the marking process using additional spectral information from the scanned material obtained through additional spectral channels is described in co-pending application Ser. No. 09/047, 453, assigned to Xerox Corporation. The techniques described in that application require additional hardware, such as an optical system, to determine the marking process.

SUMMARY OF THE INVENTION

It would be advantageous to have methods and apparatus that automatically identify the marking process and materials without requiring additional hardware.

Images carried on substrates exhibit unique spatial characteristics depending on the marking process used to form these images. This invention provides methods and apparatus that automatically identify a marking process based on at least one spatial characteristic of the marked image.

In one exemplary embodiment of the systems and methods of this invention, the spatial characteristic is identified using a power spectrum of the image.

In other exemplary embodiments of the systems and methods of this invention, the power spectrum is analyzed according to the existence, position, and/or color of spectral peaks in the power spectrum.

In other exemplary embodiments of the systems and methods of this invention, the power spectrum is analyzed according to the existence or absence of abnormally high energy in the high frequencies in the power spectrum.

These and other features and advantages of this invention are described in or are apparent from the following detailed description of preferred embodiments.

BRIEF DESCRIPTION OF THE DRAWINGS

Preferred embodiments of this invention will be described in detail, with reference to the following figures, in which.

DETAILED DESCRIPTION OF PREFERRED EMBODIMENTS

Figure 1:
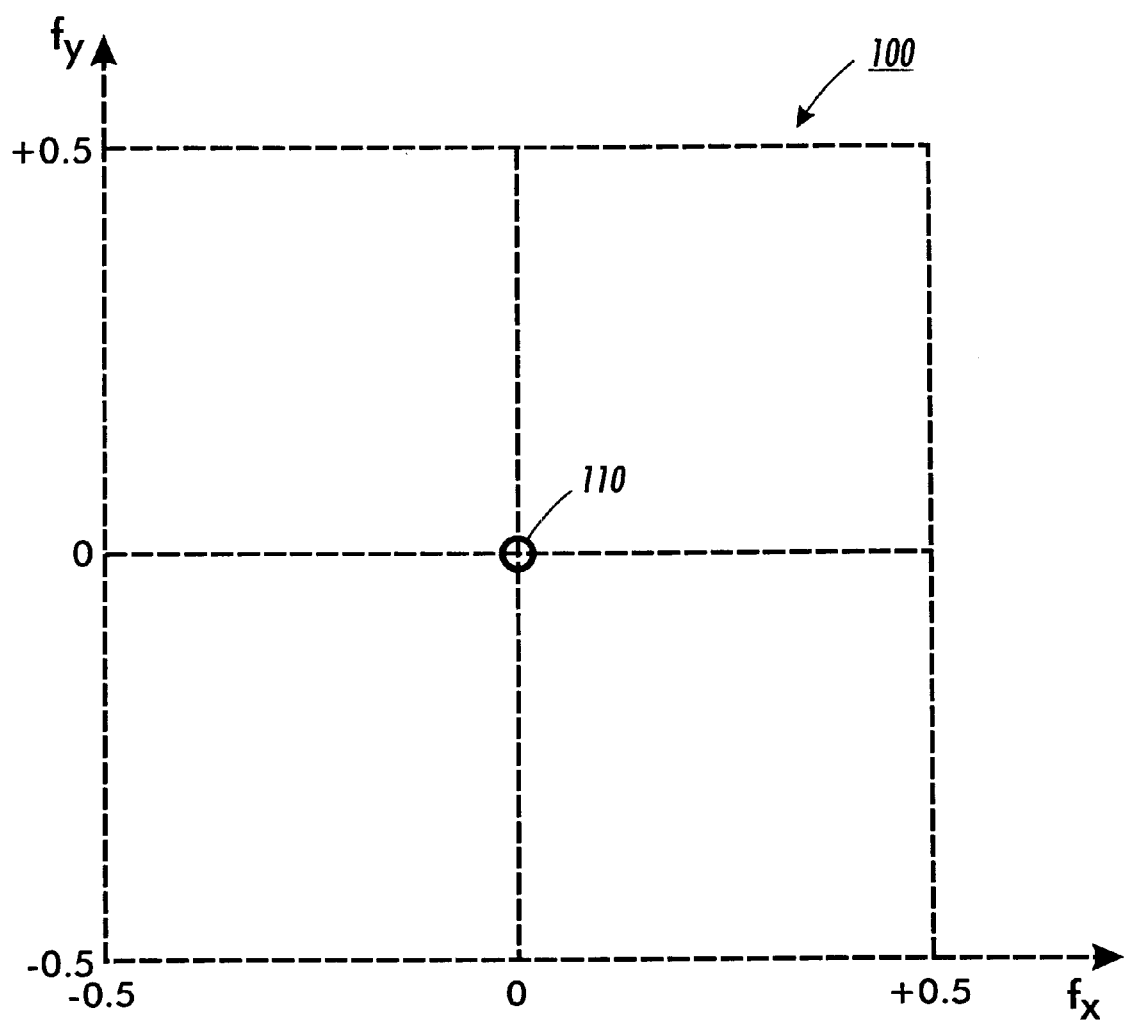
FIG. 1 shows an example of a power spectrum of an image marked by a photographic marking process.

FIG. 1 shows an example of a power spectrum 100 of an image formed using a photographic marking process. This power spectrum 100 is characterized by the absence of any spectral peaks away from an origin 110.

Figure 2:
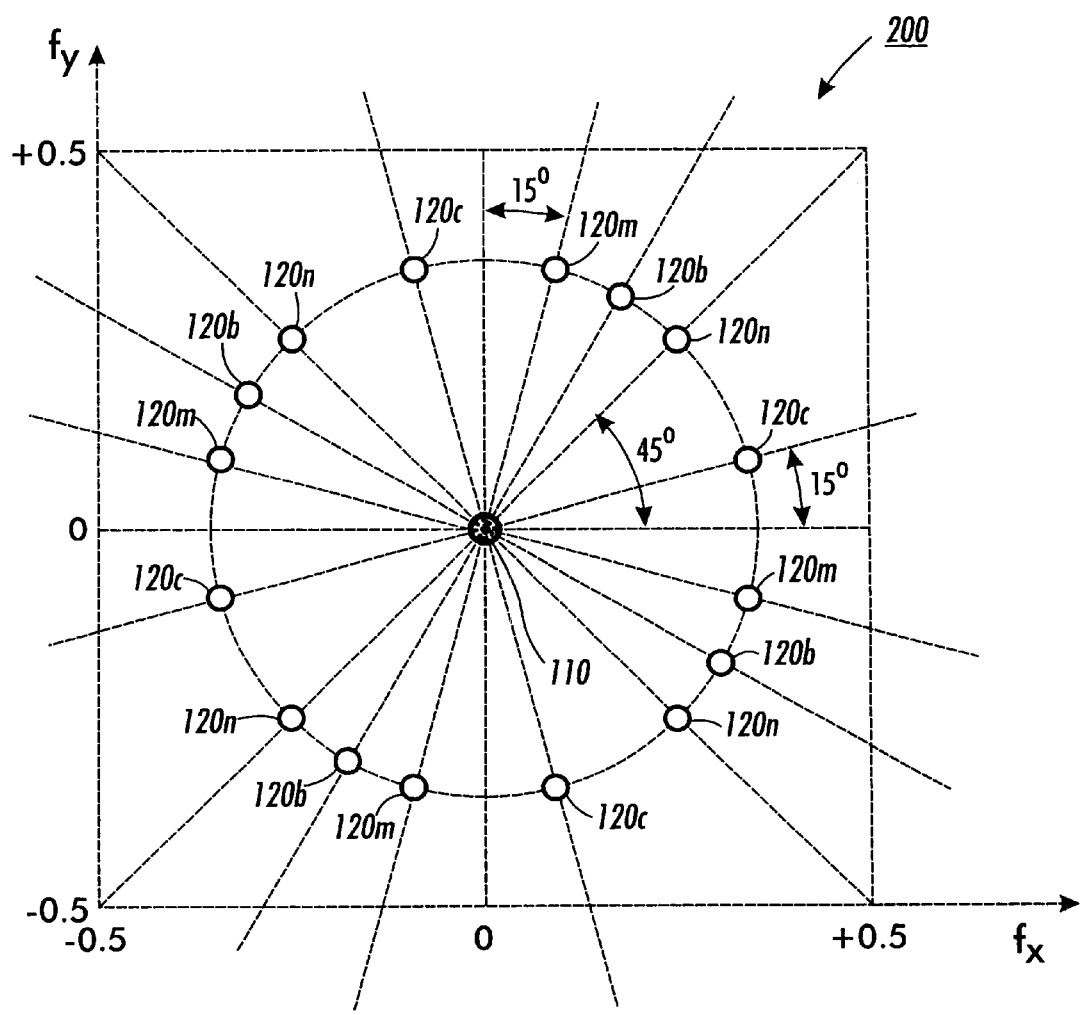
FIG. 2 shows an example of a power spectrum of an image marked by a lithographic marking process.

FIG. 2 shows an example of a power spectrum 200 of an image formed using a lithographic marking process. This power spectrum 200 is characterized by spectral peaks 120 that form a substantially circular pattern around the origin 110. The spectral peaks 120 include spectral peaks $120_N$, $120_C$, $120_B$, and $120_M$. The spectral peaks $120_N$ have no color, or are neutral in color. The spectral peaks $120_C$ are cyan in color. The spectral peaks $120_B$ are blue in color, and are somewhat lighter in shade than the cyan-colored peaks $120_C$. The spectral peaks $120_M$ are magenta in color.

As described in U.S. Pat. No. 5,166,809 to Craig L. Surbrook, conventional lithography uses specific screen frequencies, which correspond to the radius of the circular pattern, and screen angles, which correspond to the angular placement of the peaks in the circle. For example, the spectral peaks 120 are positioned at specific angles within the power spectrum 200, and each spectral peak 120 is positioned at 90° with respect to adjacent spectral peaks of the same color. The cyan peaks 120C are located at angles of 15°, 105° 195°° and 285°. The neutral peaks $120_N$ are located at 45°, 135°, 225° and 315°. The blue peaks $120_B$ are located at 60°, 150°, 240° and 330°. The magenta peaks $120_M$ are located at 75°, 165°, 255° and 345°.

The power spectrum shown in FIG. 2, and the power spectra shown in the following FIGS. 3 and 4, correspond to cases in which the image is oriented with sides of the image parallel to sides of, for example, a platen on which the image is placed. It should be appreciated that if the image is rotated with respect to the platen, the positions of the spectral peaks 120 will be rotated a corresponding angle from the positions shown in the figures.

Figure 3:
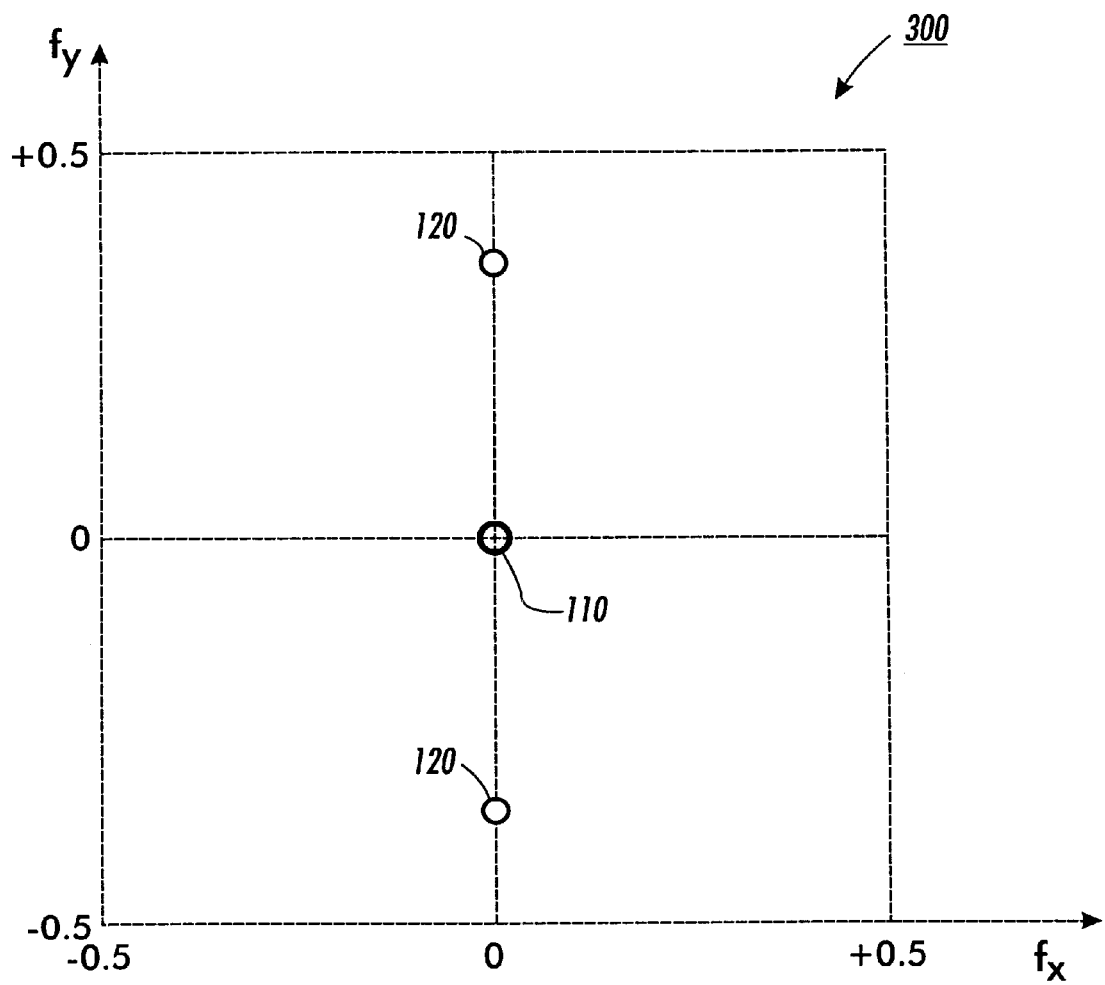
FIG. 3 shows an example of a power spectrum of an image marked by a line-on-line xerographic marking process.

FIG. 3 shows an example of a power spectrum 300 of an image formed using a line-on-line xerographic marking process. This power spectrum 300 is characterized by two predominant spectral peaks 120 that lie along a line passing through the origin 110, and which are symmetrical about the origin 110, and by an absence of color in the spectral peaks 120.

Figure 4:
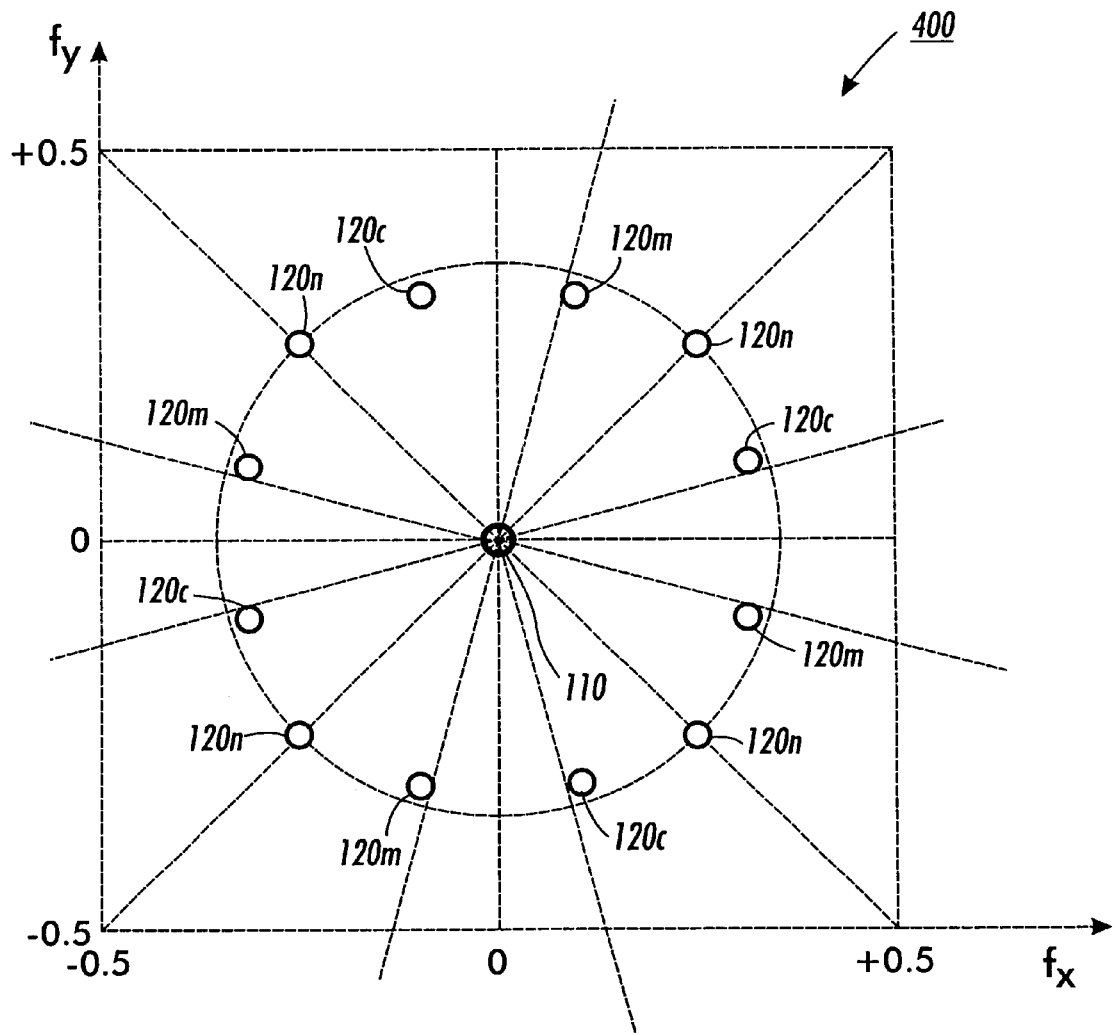
FIG. 4 shows an example of a power spectrum of an image marked by a rotated-screen xerographic marking process.

FIG. 4 shows an example of a power spectrum 400 of an image formed using a rotated-screen xerographic marking process. This power spectrum 400 is characterized by color, for example cyan and magenta, in some of the spectral peaks 120, i.e., the peaks $120_C$ and $120_M$, and a lack of a circular placement of the predominant spectral peaks 120. The spectral peaks shown in FIG. 4 may also have a specific angular relationship, similar to that described above in conjunction with FIG. 2.

Figure 5:
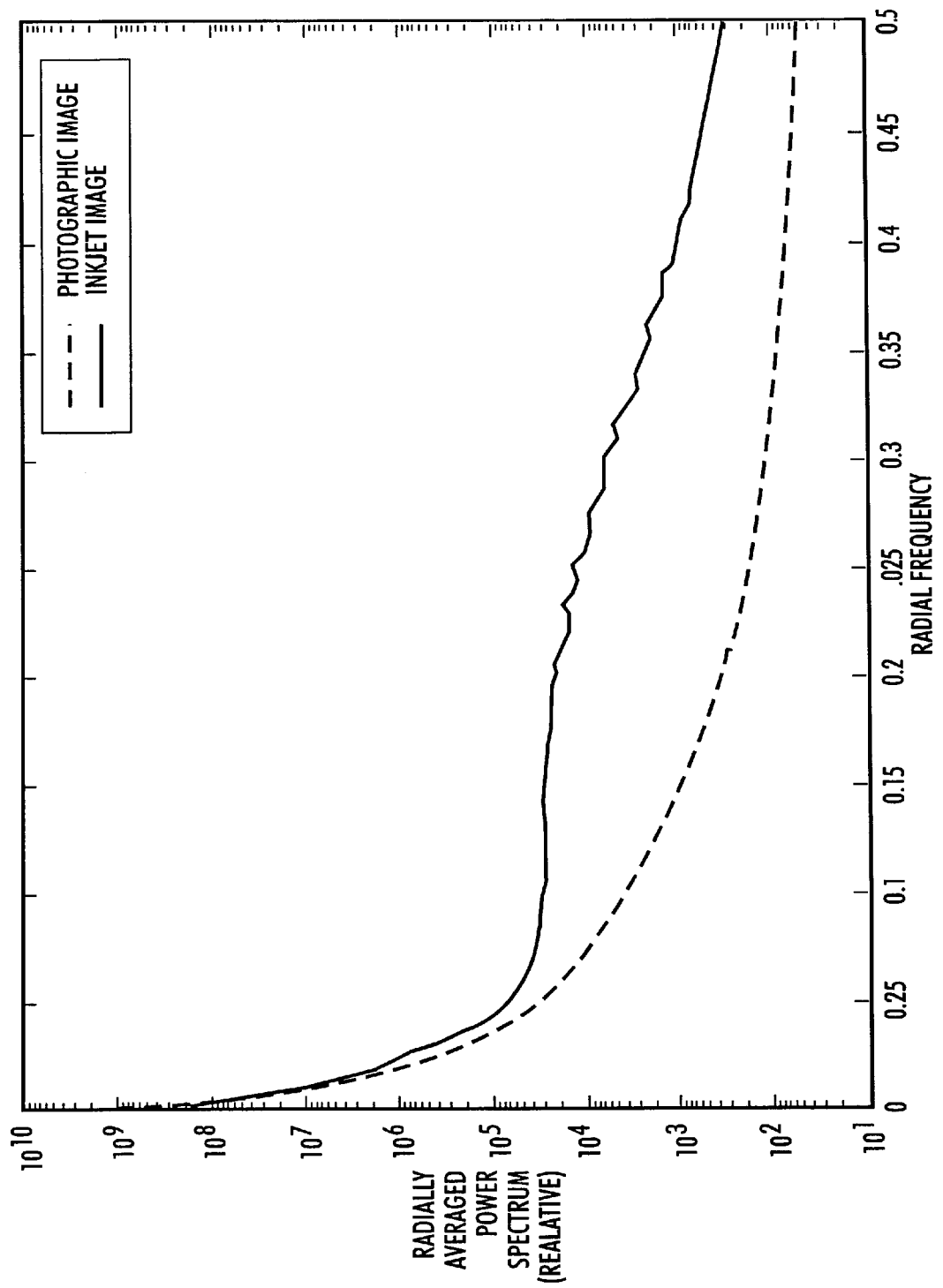
FIG. 5 shows a comparison of a radially averaged power spectrum of images marked by an ink-jet process and by a photographic process.

FIG. 5 shows a comparison of the radially averaged power spectrum of images marked by and ink-jet process and by a photographic process. These radially averaged power spectra demonstrate that the ink-jet image power spectrum is characterized by higher energy content at the higher frequencies in relation to the photographic image power spectrum. Note that the X-axis in the plots represents radial spatial frequency and the Y-axis represents the power in the scanned image data contained at that spatial frequency. For the photographic image, the power continues to decrease rapidly with increasing frequency, whereas, for the ink-jet image, the power falls initially and then stagnates at a relatively higher level than the photographic image. It will be appreciated by those skilled in the art that this power at higher halftone frequencies is due to the error-diffusion halftones and stochastic screens commonly used in ink-jet printers.

Figure 6:
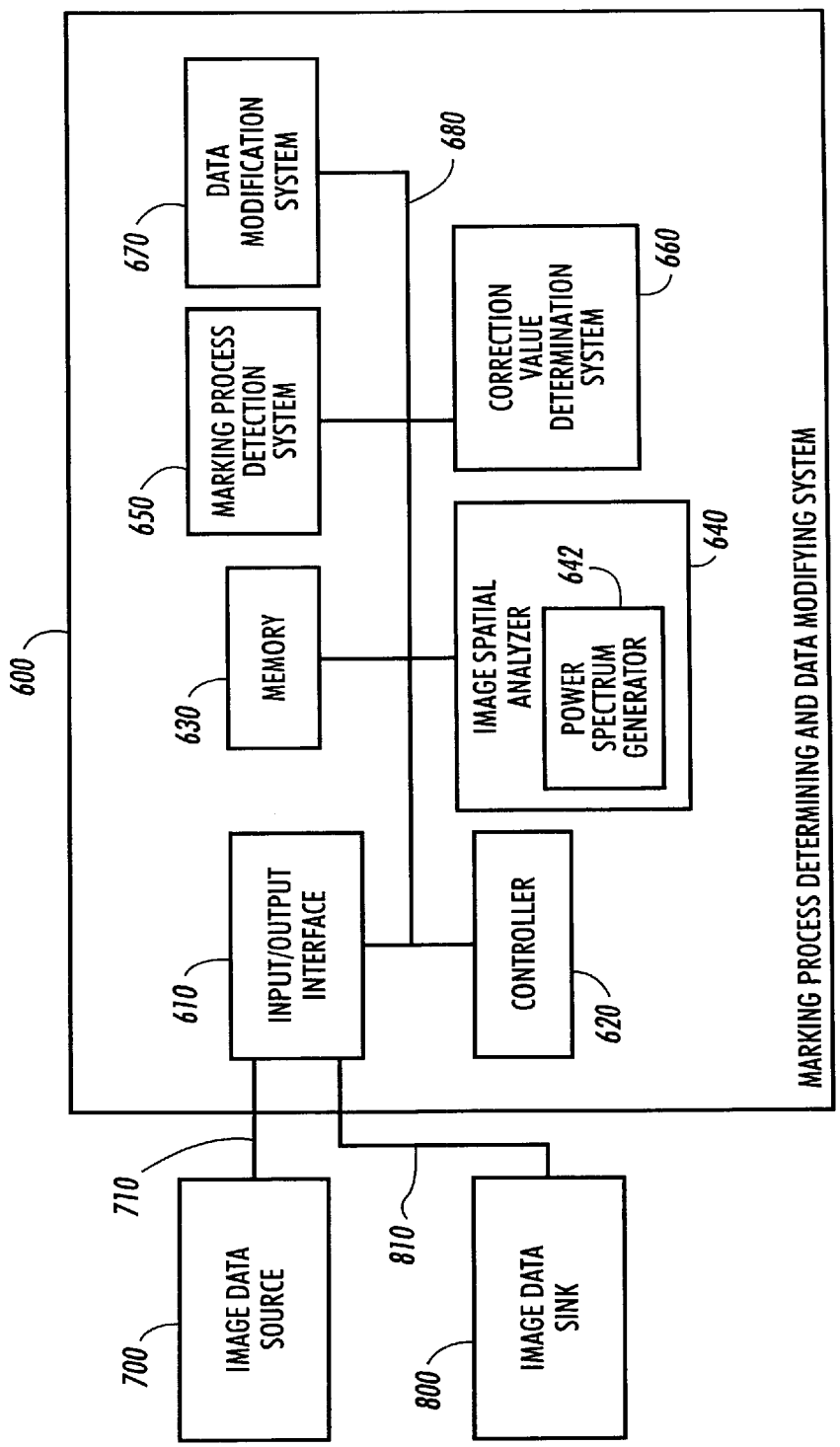
FIG. 6 is a functional block diagram of one exemplary embodiment of a marking process determining and data modifying system according to this invention.

FIG. 6 is a functional block diagram of one exemplary embodiment of a marking process determining and data modifying system 600 according to this invention. The marking process determining and data modifying system 600 includes an input/output interface 610, a controller 620, a memory 630, an image spatial analyzer 640, a marking process detection system 650, a correction value determination system 660, and a data modification system 670, which are interconnected by a data/control bus 680. An external image data source 700 and an external image data sink 800 are connected to the image input/output interface 610 of the marking process determining and data modifying system 600.

The marking process determining and data modifying system 600 shown in FIG. 6 is connected to the image data source 700, over a signal line or link 710, that provides scanned image data, and to an image data sink 800, over a signal line or link 810, that receives the re-calibrated image data output by the marking process determining and data modifying system 600. In general, the image data source 700 can be any one of a number of different sources, such as a scanner, a digital copier, a facsimile device that is suitable for generating electronic image data, or a device suitable for storing and/or transmitting electronic image data, such as a client or server of a network, or the Internet, and especially the World Wide Web. For example, the image data source 700 may be a scanner, or a data carrier such as a magnetic storage disk, CD-ROM or the like, or a host computer, that contains scanned image data.

Thus, the image data source 700 can be any known or later developed source that is capable of providing scanned image data to the marking process determining and data modifying system 600 of this invention. Similarly, the image data sink 800 can be any known or later developed device that is capable of receiving the re-calibrated image data output by the marking process determining and data modifying system 600 and either storing, transmitting, or displaying the re-calibrated image data. Thus, the image data sink 800 can be either or both of a channel device for transmitting the re-calibrated image data for display or storage or a storage device for indefinitely storing the re-calibrated image data until there arises a need to display or further transmit the re-calibrated image data.

The channel device can be any known structure or apparatus for transmitting the enhanced image data from the marking process determining and data modifying system 600 to a physically remote storage or display device. Thus, the channel device can be a public switched telephone network, a local or wide area network, an intranet, the Internet, a wireless transmission channel, any other distributing network, or the like. Similarly, the storage device can be any known structural apparatus for indefinitely storing the enhanced image data, such as a RAM, a hard drive and disk, a floppy drive and disk, an optical drive and disk, a flash memory or the like. For example the image data sink 800 may be a printer, a facsimile machine, a digital copier, a display, a host computer, a remotely located computer, or the like.

Moreover, the marking process determining and data modifying system 600 can be implemented as software executing on a programmed general purpose computer, a special purpose computer, a microprocessor or the like. In this case, the marking process determining and data modifying system 600 can be implemented as a routine embedded in a printer driver, as a resource residing on a server, or the like. The marking process determining and data modifying system 600 can also be implemented by physically incorporating it into a software and/or hardware system, such as the hardware and software systems of a printer or a digital photocopier.

The memory 630 is preferably implemented using static or dynamic RAM. However, the memory 630 can also be implemented using a floppy disk and disk drive, a writable optical disk and disk drive, a hard drive, flash memory or the like.

Each of the links 710 and 810 can be any known or later developed device or system for connecting the image data source and sink 700 and 800 to the marking process determining and data modifying system 600, including a direct cable connection, a connection over a wide area network or a local area network, a connection over an intranet, a connection over the Internet, or a connection over any other distributed processing network or system. In general, each of the links 710 and 810 can be any known or later developed connection system or structure usable to connect the image data source and sink 700 and 800 to the marking process determining and data modifying system 600. Further, it should be appreciated that the source 700 and/or sink 800 may be connected to the marking process determining and data modifying system 600 directly, as dedicated devices.

While FIG. 6 shows the marking process determining and data modifying system 600 as a separate device from the image data source 700 and the image data sink 800, the marking process determining and data modifying system 600 may be an integrated device, such as a digital copier, computer with a built-in printer, or any other integrated device that is capable of producing a hard copy image output. With such a configuration, for example, the image data source 700, the marking process determining and data modifying system 600, and the image data sink 800 may be contained within a single device. For example, in the case of a digital copier, the marking process determining and data modifying system 600, an image data source 700 such as a scanning device, and an image data sink 800 such as print-out device may all be provided in the same machine. As another example, in the case of a scanner, the marking process determining and data modifying system 600 and the image data source 700, for example a scanning device, may be part of the same machine, and the image data sink 800, for example a printer or a computer memory, may be physically separate.

Scanned image data is input to the marking process determining and data modifying system 600 from the image data source 700 via the input/output interface 610 under control of the controller 620. The memory 630 stores the scanned image data before and/or after further processing within the marking process determining and data modifying system 600. The memory 630 may also store any programs used to control the marking process determining and data modifying system 600, and/or pre-determined values and/or tables to be used by the marking process detection system 650, the correction value determination system 660 and/or the data modification system 670.

The image spatial analyzer 640 analyzes the scanned image data to determine at least one spatial characteristic of the scanned image data under control of the controller 620. In one exemplary embodiment, the image spatial analyzer 640 includes a power spectrum generator 642 that generates a power spectrum for the scanned image data. Under control of the controller 620, the marking process detection system 650 detects the marking process used to form the image based on the at least one spatial characteristic determined by the image spatial analyzer 640. The correction value determination system 660, under control of the controller 620, determines a correction value to be applied to the image data in accordance with the marking process detected by the marking process detection system 650. The data modification system 670, under control of the controller 620, modifies the image data using the determined correction value.

In general, as stated above, in the marking process determining and data modifying system 600 shown in FIG. 6, scanned image information is input from the image data source 700 via the image input/output interface 610. The image data may be stored in the memory 630 under control of the controller 620 before and/or after being further processed.

Data that has been stored in the memory 630 is input to the image spatial analyzer 640, or, alternatively, data is input directly from the image input/output interface 610 to the image spatial analyzer 640. The image spatial analyzer 640, using any suitable known or later developed spatial analyzing technique, obtains at least one spatial characteristic of the scanned image data from the scanned image data. In one exemplary embodiment of the image spatial analyzer 640, the image spatial analyzer 640 obtains the at least one spatial characteristic from a power spectrum of the image generated by the power spectrum generator 642. As described above, exemplary power spectra for different marking processes, each exhibiting at least one unique spatial characteristic, are shown in FIGS. 1–5.

Methods for obtaining such a power spectrum estimate for a gray-scale image are described, for example, in J. S. Lim, *Two Dimensional Signal and Image Processing*, Prentice Hall, 1990. The methods disclosed by Lim could be applied on a per-color-channel (RGB) basis to obtain the power spectrum for a color image.

Additionally, in some embodiments of this invention, the image spatial analyzer 640 and/or the power spectrum generator 642 may determine a radially averaged power spectrum, for example as described in Robert Ulichney, *Digital Halftoning*, MIT Press, 1987.

While this exemplary embodiment of the image spatial analyzer 640 uses image power spectra to analyze the scanned image data and to determine image spatial characteristics, it should be appreciated that other known or later developed spatial analyzing techniques, such as wavelet decomposition or the like, may also be used by the image spatial analyzer 640 to determine the image spatial characteristics.

After the scanned image data has been analyzed by the image spatial analyzer 640, the marking process detection system 650, under control of the controller 620, detects the marking process based on the spatial characteristics of the scanned image data obtained by the image spatial analyzer 640.

In other exemplary embodiments, the marking process detection system 650 may detect the marking process using another known or later developed automatic detection technique that does not necessarily require information from the image spatial analyzer 640.

One such technique that identifies the marking process using additional spectral information from the scanned material obtained through additional spectral channels is described in co-pending application Ser. No. 09/047,453, assigned to Xerox Corporation, the disclosure of which is incorporated herein by reference in its entirety. In this technique, at least one detector having an array of cells is provided. One cell in the detector array is provided with an extra colored coating or is painted with an extra color. The coated or painted cell is a sensor cell. When an image is scanned by the detector, the sensor cell reads a different color value from the other cells due to the extra coating applied to it. The color that the sensor cell would have output without the extra coating is interpolated from the outputs of the cells neighboring the sensor cell. This color and the color actually detected by the sensor cell are then input to a controller which determines at least one attribute of the scanned image, such as the marking process used to form the image. When this or any other technique is used, the image spatial analyzer 640 may be replaced or supplemented by any additional structure needed to implement the technique.

The correction value determination system 660 receives an indication of the detected marking process from the marking process detection system 650 under control of the controller 620 and determines a correction value to apply to the image based on the detected marking process. The correction value is supplied to the data modification system 670 under control of the controller 620. The data modification system 670 modifies the image data based on the correction value.

The modified image data is either output directly to the image data sink 800, or is output to the image data sink 800 after being temporarily stored in the memory 630.

Within the marking process determining and data modifying system 600, all storing, analyzing and modifying of the image data is performed under the control of the controller 620. It should be appreciated that the controller 620 may comprise any number of components and/or functions, and need not be physically located in a single location within the digital image processing system 600.

It should be understood that each of the systems shown in FIG. 6 can be implemented as portions of a suitably programmed general purpose computer. Alternatively, each of the systems shown in FIG. 6 can be implemented as physically distinct hardware circuits within an ASIC, or using a FPGA, a PDL, a PLA or a PAL, or using discrete logic elements or discrete circuit elements. The particular form each of the systems shown in FIG. 6 will take is a design choice and will be obvious and predicable to those skilled in the art.

Figure 7:
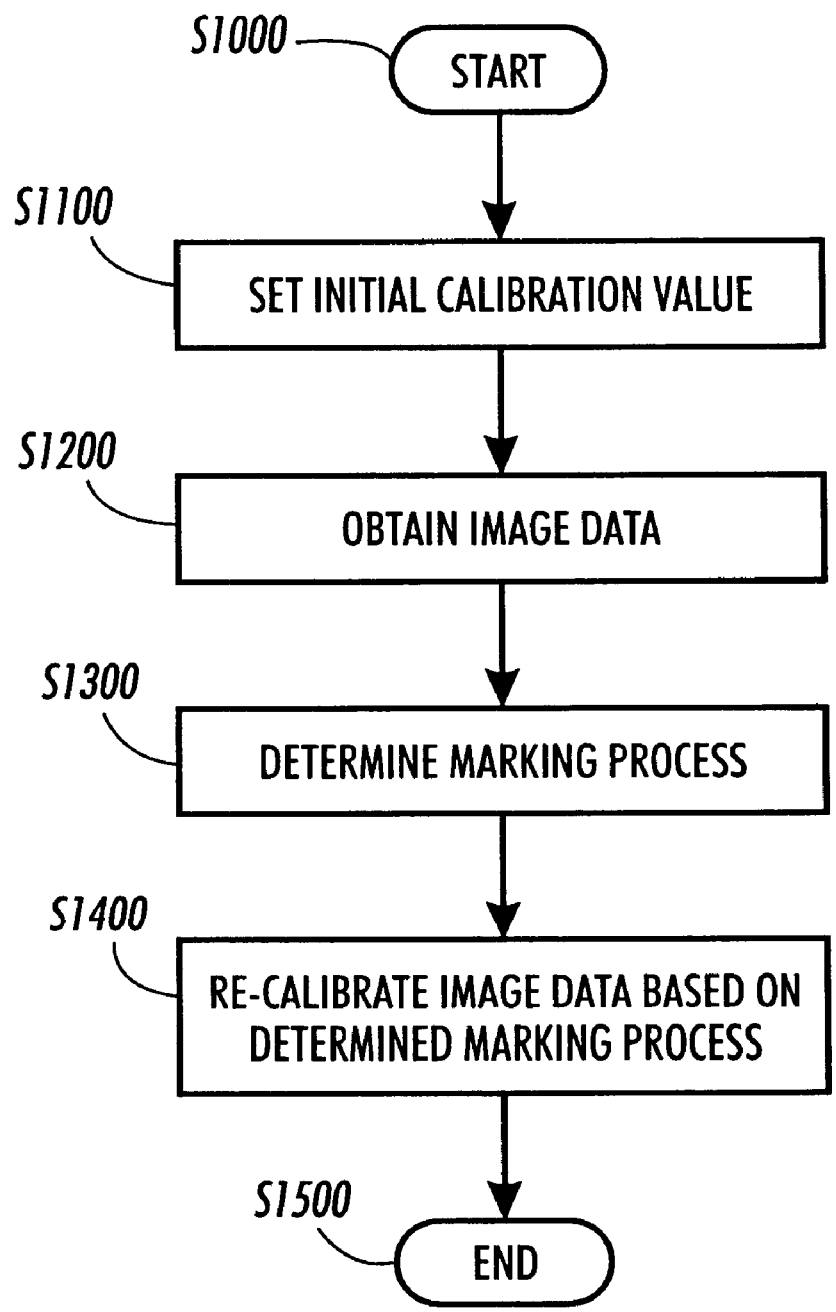
FIG. 7 is a flowchart outlining one exemplary embodiment of a method for re-calibrating image data according to this invention.

FIG. 7 is a flowchart outlining one exemplary embodiment of a method for re-calibrating scanned image data according to this invention. Beginning in step S1000, control continues to step S1100, where an initial calibration value is set. This initial calibration value may be a compromise calibration value between individual optimal calibration values for respective ones of a plurality of marking processes. Next, in step S1200, image data is obtained by scanning, for example. It should be appreciated that the image data could have been obtained at any previous time. In this case, in step S1200, the previously obtained image data is merely input. Control then continues to step S1300.

In step S1300, the type of marking process, used to form the image from which the image data was obtained, is determined. Then, in step S1400, the image data is re-calibrated based on the determined marking process. Next, in step S1500, the re-calibration method ends.

Figure 8:
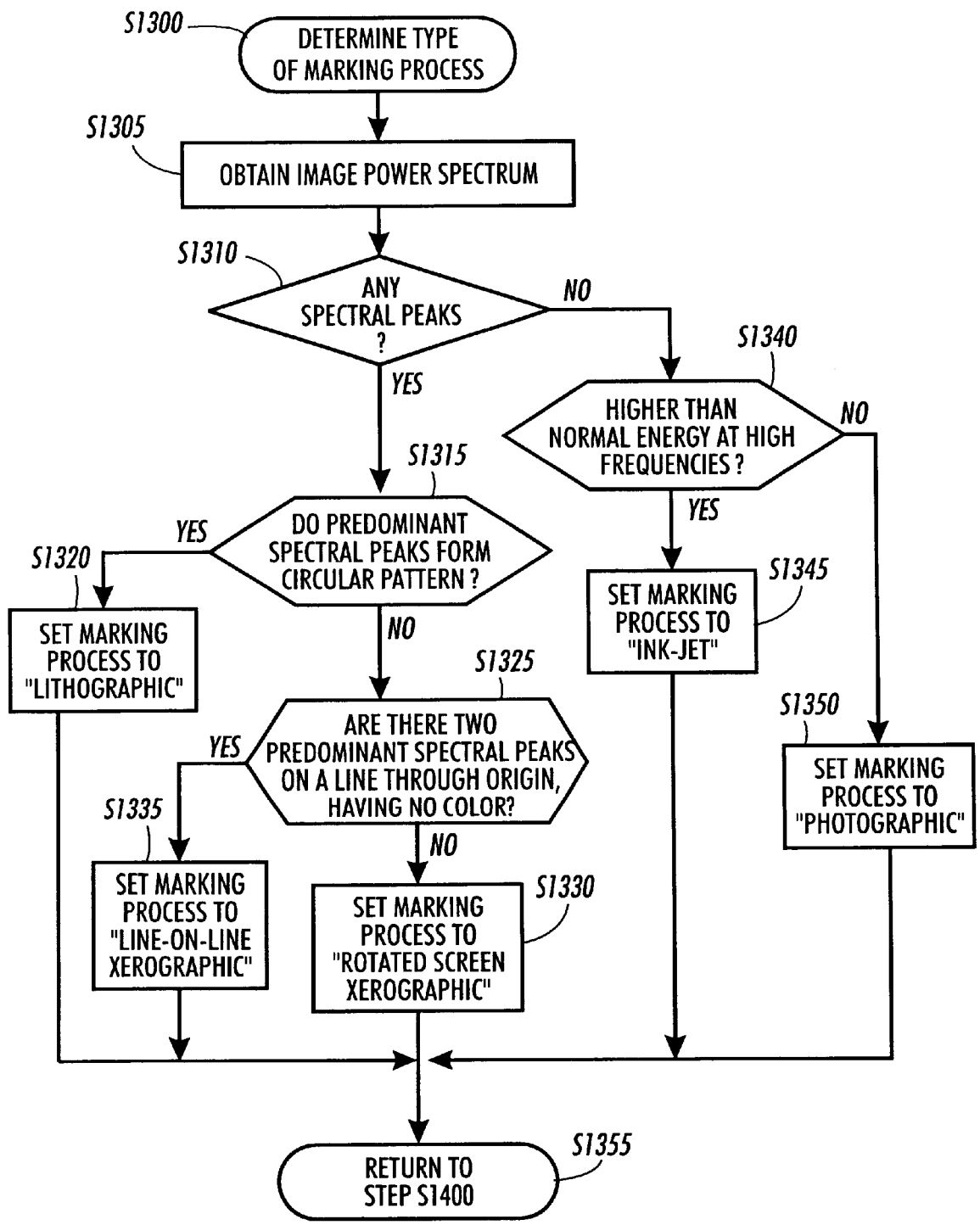
FIG. 8 is a flowchart outlining in greater detail one exemplary embodiment of a method for determining the marking process of FIG. 7.

FIG. 8 is a flowchart outlining in greater detail one exemplary embodiment of a method for determining the marking process of step S1300. Beginning in step S1300, control continues to step S1305, where a power spectrum is obtained from the obtained image data. Next, in step S1310, the power spectrum is analyzed to determine whether there are any spectral peaks in the power spectrum. If there are no spectral peaks, control jumps to step S1340. Otherwise, control continues to step S1315.

In step S1315, the power spectrum is further analyzed to determine whether the predominant spectral peaks form a specified pattern, such as a substantially circular pattern. If the predominant spectral peaks form the specified pattern, control continues to step S1320. Otherwise, control jumps to step S1325. In step S1320, the marking process used to mark the scanned image is determined to be a lithographic marking process. Control then jumps to step S1355.

In step S1325, the power spectrum is further analyzed to determine whether there are two predominant spectral peaks located on a line through the origin and having no color. If there are two predominant spectral peaks located on a line through the origin and having no color, control jumps to step S1335. Otherwise, control continues to step 1330. In step S1330, the marking process is determined to be a rotated-screen xerographic marking process. Control then jumps to step S1355. In contrast, in step S1335, the marking process is determined to be a line-on-line xerographic marking process. Control then again jumps to step S1355.

In step S1340, the power spectrum is analyzed to determine whether there a higher than normal energy content at high frequencies. If the energy in high frequencies is higher than normal, control continues to step S1345. Otherwise, control jumps to step S1350. In step S1345, the marking process is determined to be an ink-jet marking process. Control then again jumps to step S1355. In contrast, in step S1350, the marking process is determined to be a photographic marking process. Control then continues to step S1355, where control returns to step S1400.

The marking process determining and data modifying system 600 described above is preferably implemented on a programmed general purpose computer. However, the marking process determining and data modifying system 600 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 7–8, can be used to implement the marking process determining and data modifying system.

While the invention has been described in conjunction with the specific embodiments described above, many equivalent alternatives, modifications and variations will become apparent to those skilled in the art once given this disclosure. Accordingly, the preferred embodiments of the invention as set forth above are considered to be illustrative and not limiting. Various changes to the described embodiments may be made without departing from the spirit and scope of the invention.

For example, while detection of the specific marking processes of photographic, lithographic, ink-jet, line-on-line xerographic or rotated-screen xerographic has been described as an example, it is clear that images marked by other known or later developed marking process may also exhibit unique spatial characteristics from which the marking process may be identified. Additionally, in a copier that includes a scanner and a printer, a print signature unique to the printer may be detected from image spatial characteristics, thereby indicating whether the image has been produced by the printer. The scanner could then recognize images that have been produced by the printer.

What is claimed is:

1. A method of identifying a marking process used to form an image on a substrate, comprising:

obtaining at least one spatial characteristic based on a power spectrum of image data obtained from the image; and determining the marking process used to form the image based on the at least one spatial characteristic.

2. The method as set forth in claim 1, further comprising scanning the image to obtain the image data.

3. The method as set forth in claim 1, wherein obtaining the at least one spatial characteristic comprises obtaining at least one power spectrum of the image.

4. The method as set forth in claim 3, wherein determining the marking process comprises at least one of:

determining whether there is at least one spectral peak away from an origin in the at least one power spectrum;

determining whether there is a specified pattern of predominant spectral peaks in the at least one power spectrum;

determining whether there is higher than normal high frequency energy in the at least one power spectrum; and determining whether there is at least one spectral peak that contains color in the at least one power spectrum.

5. The method as set forth in claim 4, wherein the marking process is determined to be a photographic marking process when there are no spectral peaks away from the origin and there is no abnormally high energy contained in the high frequencies in the at least one power spectrum.

6. The method as set forth in claim 4, wherein the marking process is determined to be an ink-jet marking process when there are no spectral peaks away from the origin and there is higher than normal energy contained in the high frequencies in the at least one power spectrum.

7. The method as set forth in claim 4, wherein the marking process is determined to be a lithographic marking process when there are a plurality of spectral peaks away from the origin, the specified pattern is a substantially circular pattern, and a plurality of predominant spectral peaks are in the specified pattern in the at least one power spectrum.

8. The method as set forth in claim 4, wherein the marking process is determined to be a line-on-line xerographic marking process when there are two predominant spectral peaks away from the origin, the specified pattern is a line through the origin, the two predominant peaks are in the specified pattern symmetrically about the origin, and none of spectral peaks contain color in the at least one power spectrum.

9. The method as set forth in claim 4, wherein the marking process is determined to be a rotated screen xerographic marking process when there is at least one spectral peak away from the origin, the specified pattern is a substantially circular pattern, the at least one predominant spectral peak does not form the specified pattern in the at least one power spectrum, and at least one of the at least one spectral peak contains color in at least one power spectrum.

10. A marking process determining system that automatically detects a marking process used to form an image, comprising:

an image spatial analyzer that analyzes image data corresponding to the image to determine at least one spatial characteristic based on a power spectrum of the image data; and a marking process detection system that detects the marking process based on the at least one spatial characteristic.

11. The marking process determining system as set forth in claim 10, wherein the image spatial analyzer comprises a power spectrum generator that generates at least one power spectrum of the image.

12. The marking process determining system as set forth in claim 11, wherein the at least one spatial characteristic comprises at least one spectral peak away from an origin in the at least one power spectrum.

13. The marking process determining system as set forth in claim 11, wherein the at least one spatial characteristic comprises an absence of spectral peaks away from an origin, and an absence of high frequencies in the at least one power spectrum.

14. The marking process determining system as set forth in claim 11, wherein the at least one spatial characteristic comprises an absence of spectral peaks away from an origin, and at least one high frequency in the at least one power spectrum.

15. The marking process determining system as set forth in claim 11, wherein the at least one spatial characteristic comprises a plurality of spectral peaks in a specified pattern in the at least one power spectrum.

16. The marking process determining system as set forth in claim 15, wherein the specified pattern is a substantially circular pattern.

17. The marking process determining system as set forth in claim 15, wherein there are two predominant spectral peaks away from an origin in the at least one power spectrum, the specified pattern is a line through the origin, the two predominant peaks are in the specified pattern symmetrically about the origin, and none of the spectral peaks contain color.

18. The marking process determining system as set forth in claim 11, wherein the at least one spatial characteristic comprises at least one spectral peak away from the origin in the at least one power spectrum, and a presence of color in at least one of the at least one spectral peak.

19. The marking process determining system as set forth in claim 10, wherein the marking process detection system detects the marking process to be one of a photographic marking process, a lithographic marking process, an ink-jet marking process, a line-on-line xerographic marking process and a rotated-screen xerographic marking process.

20. A scanner incorporating the marking process determining system as set forth in claim 10.

21. A digital copier incorporating the marking process determining system as set forth in claim 10.

* * * * *